(12) United States Patent  
Carnevali

(10) Patent No.: US 7,891,719 B2  
(45) Date of Patent: Feb. 22, 2011

(54) RECONFIGURABLE CONSOLE MOUNT

(76) Inventor: Jeffrey D. Carnevali, 5957 Beach Dr. SW., Seattle, WA (US) 98136

( * ) Notice: Subject to any disclaimer, the term of this patent is extended or adjusted under 35 U.S.C. 154(b) by 134 days.

(21) Appl. No.: 12/378,759

(22) Filed: Feb. 19, 2009

(65) Prior Publication Data

US 2010/0090487 A1    Apr. 15, 2010

Related U.S. Application Data

(63) Continuation-in-part of application No. 12/287,622, filed on Oct. 10, 2008, now Pat. No. 7,802,832.

(51) Int. Cl.
*B60R 13/00* (2006.01)

(52) U.S. Cl. .................................. 296/24.34
(58) Field of Classification Search .............. 296/24.34, 296/37.8, 70; 361/829

See application file for complete search history.

(56) References Cited

U.S. PATENT DOCUMENTS

| | | | | |
|---|---|---|---|---|
| 1,417,401 | A * | 5/1922 | Mahoney | 312/297 |
| D218,438 | S | 8/1970 | Shook et al. | |
| 3,550,001 | A | 12/1970 | Hanley | |
| 3,984,161 | A | 10/1976 | Johnson | |
| 4,313,646 | A * | 2/1982 | Millhimes et al. | 439/654 |
| D279,329 | S | 6/1985 | Dzak | |
| 4,733,900 | A | 3/1988 | Fluharty | |
| 4,846,382 | A | 7/1989 | Foultner et al. | |
| 4,848,627 | A * | 7/1989 | Maeda et al. | 224/275 |
| 4,942,990 | A * | 7/1990 | White | 224/42.33 |
| 5,005,898 | A | 4/1991 | Benedetto et al. | |
| 5,174,621 | A | 12/1992 | Anderson | |
| 5,181,555 | A | 1/1993 | Chruniak | |
| 5,199,772 | A | 4/1993 | Jordan | |
| 5,259,655 | A * | 11/1993 | Anderson | 296/70 |
| 5,282,556 | A | 2/1994 | Bossert | |
| 5,289,962 | A * | 3/1994 | Tull et al. | 224/549 |
| 5,418,836 | A * | 5/1995 | Yazaki | 455/569.2 |
| D363,916 | S | 11/1995 | Johnson | |
| 5,503,565 | A * | 4/1996 | McCoy | 439/171 |
| 5,680,974 | A * | 10/1997 | Vander Sluis | 296/37.9 |
| 5,743,585 | A * | 4/1998 | Pranger et al. | 296/37.12 |
| 5,857,726 | A * | 1/1999 | Yokoyama et al. | 296/70 |
| 6,045,173 | A * | 4/2000 | Tiesler et al. | 296/37.8 |
| 6,048,020 | A | 4/2000 | Gronowicz et al. | |
| D425,475 | S | 5/2000 | Herer | |
| 6,062,623 | A * | 5/2000 | Lemmen | 296/37.8 |
| 6,086,129 | A | 7/2000 | Gray | |
| D429,209 | S | 8/2000 | Inchaurregui | |

(Continued)

*Primary Examiner*—Kiran B. Patel
(74) *Attorney, Agent, or Firm*—Charles J. Rupnick, Attorney at Law

(57) ABSTRACT

A reconfigurable vehicle console having a plurality of interchangeable overlapping face plates and a single piece cup holder that is structured for coupling to the console. The cup holder is either interchangeable with one of the face plates, or is connectable to an outside surface of the console proper. The cup holder includes one or more beverage receptacle receivers each molded continuous with a top plate thereof with an opening contiguous with an external surface thereof and sized to receive a beverage receptacle, and a plurality of accessory receivers each molded continuous with the top plate with an opening contiguous with the external surface thereof, wherein at least one of the accessory receivers is molded with a different shape than the beverage receptacle receivers.

10 Claims, 8 Drawing Sheets

U.S. PATENT DOCUMENTS

| | | |
|---|---|---|
| D429,684 S | 8/2000 | Johnson |
| 6,123,377 A | 9/2000 | Lecher et al. |
| D434,365 S | 11/2000 | Herer et al. |
| 6,176,534 B1 * | 1/2001 | Duncan .................... 296/37.12 |
| D437,299 S | 2/2001 | Johnson |
| D438,841 S | 3/2001 | Smith |
| D443,246 S | 6/2001 | Smith |
| D443,855 S | 6/2001 | Herer et al. |
| D447,998 S | 9/2001 | Pfeiffer et al. |
| D453,318 S | 2/2002 | Moore |
| 6,388,881 B2 * | 5/2002 | Yamauchi et al. ........... 361/704 |
| 6,419,314 B1 * | 7/2002 | Scheerhorn ............ 297/188.19 |
| 6,428,072 B1 | 8/2002 | Moore |
| 6,709,041 B1 | 3/2004 | Hotary et al. |
| 7,029,048 B1 * | 4/2006 | Hicks et al. ............... 296/24.34 |
| 7,029,049 B2 * | 4/2006 | Rockafellow et al. ...... 296/37.8 |
| 7,165,687 B1 * | 1/2007 | Stevens et al. ............ 211/86.01 |
| 7,210,725 B2 * | 5/2007 | Moore ....................... 296/37.8 |
| 7,407,210 B2 * | 8/2008 | Arbaugh et al. ........... 296/24.34 |
| 7,416,235 B2 * | 8/2008 | Rajappa et al. ............ 296/37.8 |
| 2005/0035618 A1 * | 2/2005 | Toth et al. ................. 296/24.34 |
| 2006/0220408 A1 * | 10/2006 | Hutek et al. ................ 296/37.8 |
| 2009/0072565 A1 * | 3/2009 | Mayne, Jr. ................ 296/24.34 |

* cited by examiner

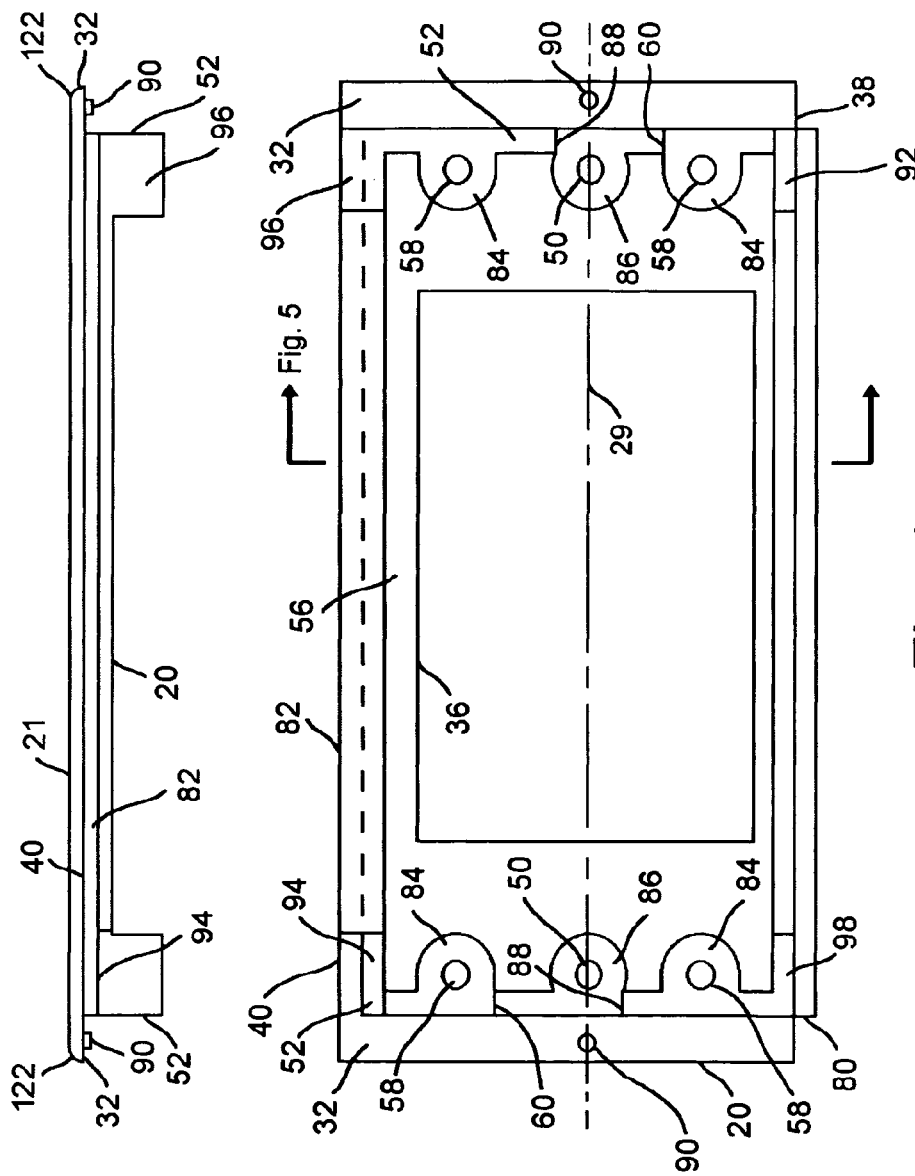

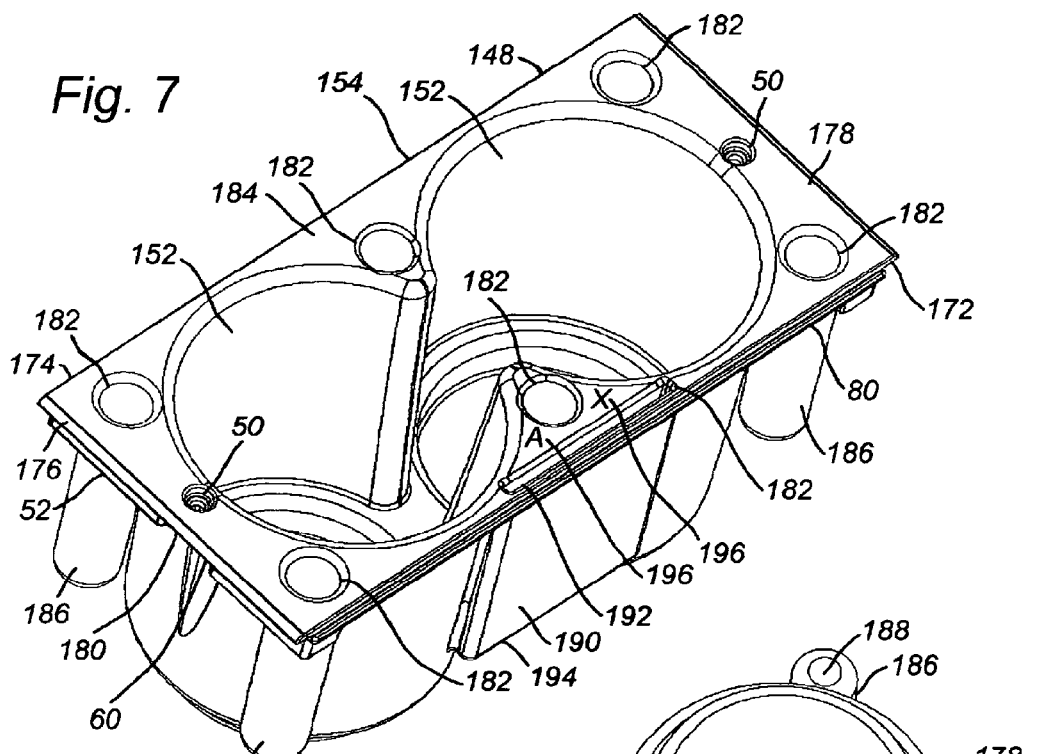

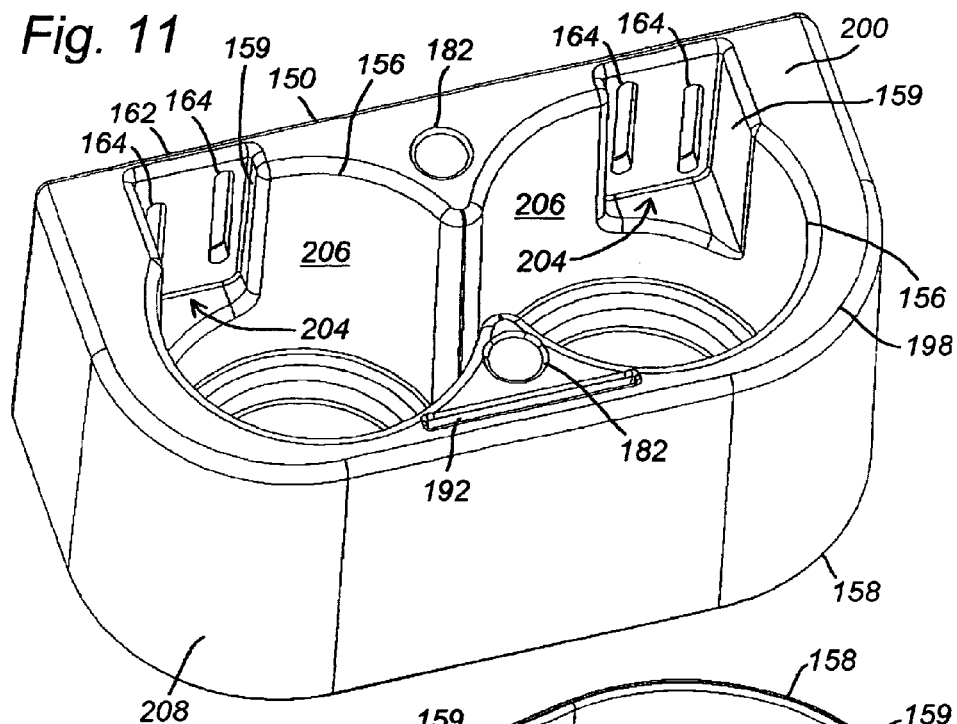
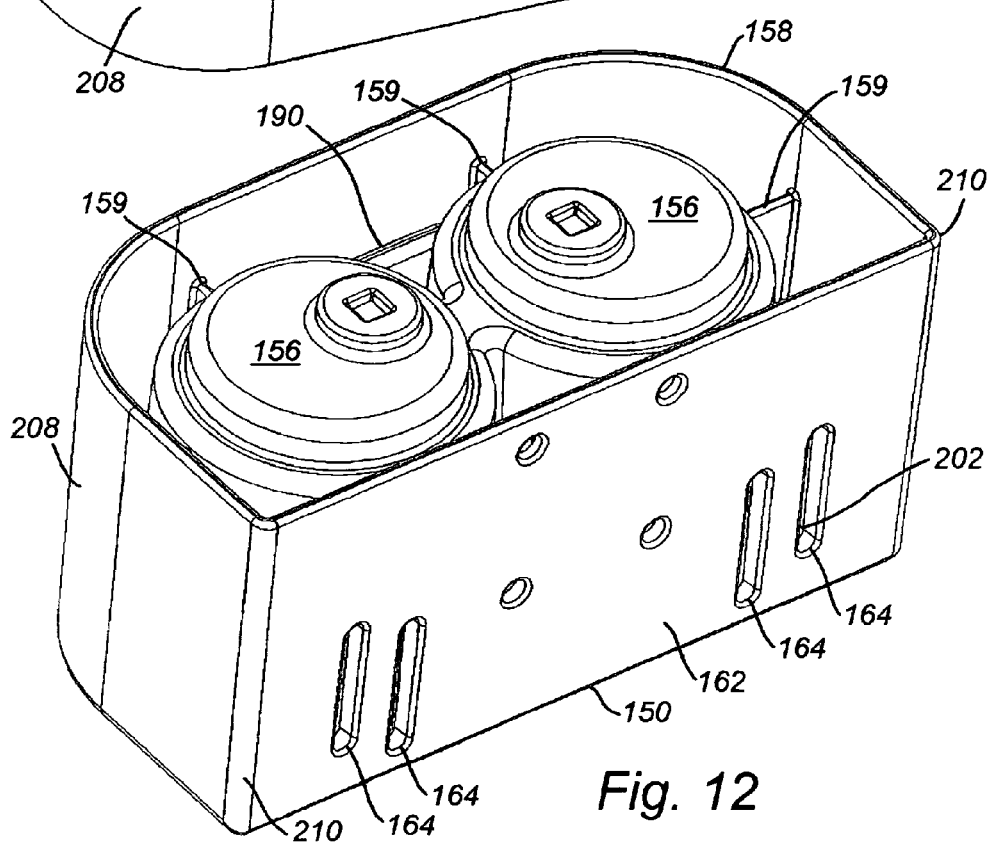

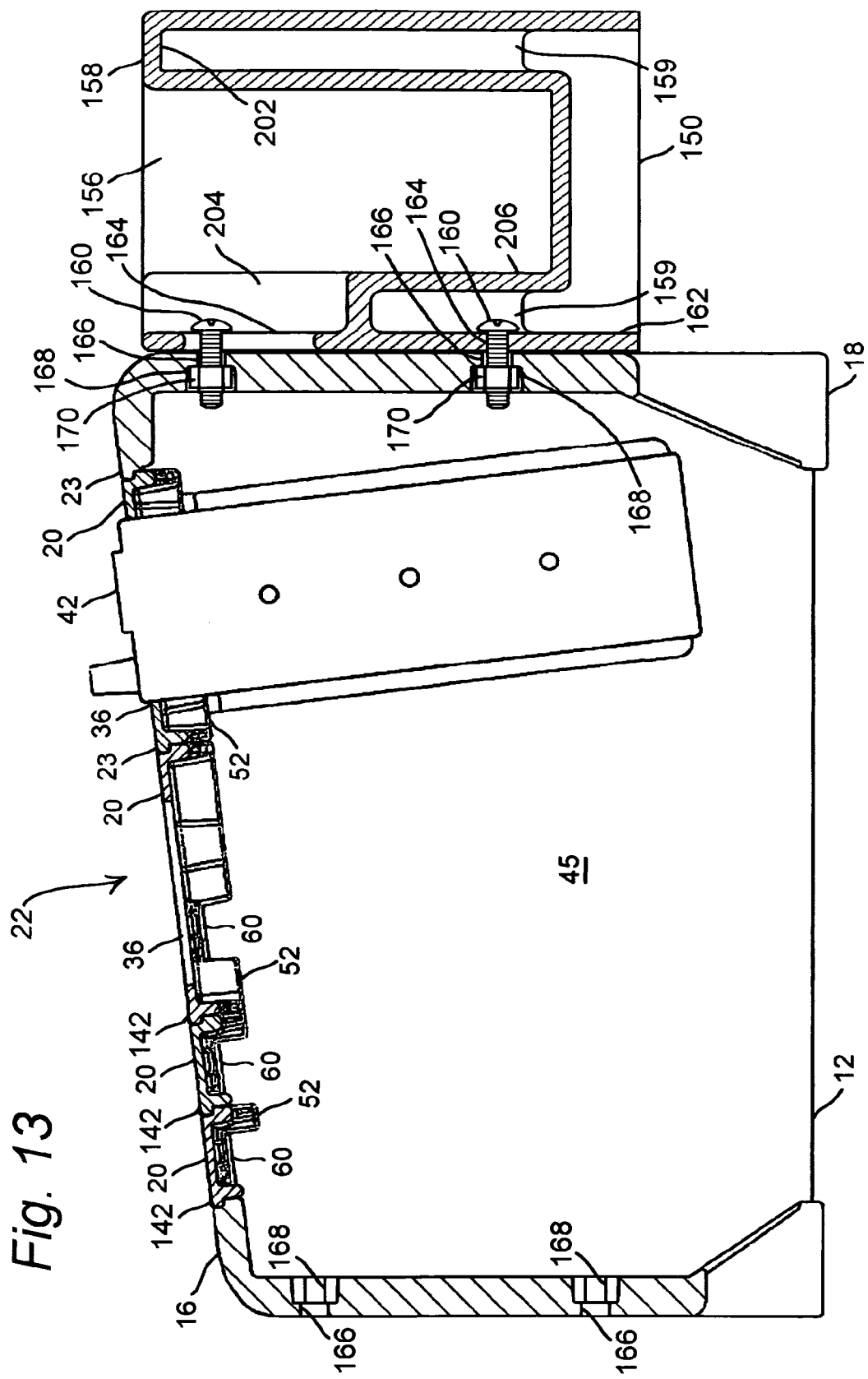

RECONFIGURABLE CONSOLE MOUNT

This application is a Continuation-in-part patent application Ser. No. 12/287,622 filed in the name of the same inventor on Oct. 10, 2008 now U.S. Pat. No. 7,802,832, which is incorporated herein by reference.

FIELD OF THE INVENTION

The present invention relates to vehicle consoles and in particular to one that provides novel reconfigurable equipment mounting features, the console being mountable within a vehicle driver compartment to support either mechanical, electrical or electromechanical equipment in a location easily accessible to an operator of the vehicle.

BACKGROUND OF THE INVENTION

Police officers, public safety officers, firefighters, paramedics and the like carry various types of equipment in their vehicles. Several pieces of equipment are often carried in a single vehicle, and the driver often needs to operate the equipment while simultaneously driving the vehicle. Thus, various devices exist to secure multiple pieces of equipment within a vehicle so that they are accessible to the driver and/or other persons in the vehicle driver compartment.

These devices commonly include a hollow rectangular box situated on the floor of the vehicle between the driver seat and front passenger seat, including a horizontal top portion having an upwardly facing opening for receiving pieces of equipment. Police cruisers, for example, are commonly fitted with equipment boxes of this type. The boxes are used to house various types of equipment and controls used by police officers, such as radios, siren controls and light bar controls. Typically, the boxes are sized and positioned so that most of the box extends between the driver seat and the front seat. Only a small portion, if any, of the box will extend forward toward the dashboard beyond the driver seat and front passenger seat. In some police cruisers, the equipment box extends all the way back to the prisoner partition separating the rear seating area from the driver compartment. A laptop computer is often positioned between the box and dashboard, and is secured to the vehicle floor with various types of mounting hardware.

Systems employing the conventional equipment box described above suffer from a number of problems associated with the structure of the box. The box includes removable multiple blank panels fastened on its top or upwardly facing surface. Removal of one or more of these blank panels opens a space where a radio or other piece of equipment can be mounted using brackets that fasten between the piece of equipment and opposing side panels of the box. Unfortunately, the equipment mounting brackets fasten to the box side panels using screws so the equipment is not easily repositioned within the bore or changed out for different pieces of equipment. Furthermore, the blank panels are simple rectangles of heavy sheet metal with squared edges that form butt joints between adjacent panels so gaps are formed between the mounted equipment and adjacent blank panels, and between side by side blank panels when no equipment is mounted.

The conventional equipment box configuration described above makes it more difficult to remove a piece of equipment from this box, or reposition it along closer to one or another of the end panels. The configuration also permits cards and other slim objects such as driver's licenses to slip through the gaps between the mounted equipment and adjacent blank panels, and between side by side blank panels.

SUMMARY OF THE INVENTION

The present invention is a reconfigurable vehicle console having a plurality of interchangeable overlapping blank and equipment mounting face plates, including both tongue-and-groove joints between adjacent face plates, as well as optional lap joints.

According to one aspect of the reconfigurable vehicle console includes a pair or opposing substantially rigid side panels, each side panel having a wall portion formed with a mounting lip portion formed along a length thereof. A pair of opposing substantially rigid end panels are substantially rigidly interconnected between opposing end portions of the side panels and spacing apart the side panels a substantially uniform distance. A plurality of interchangeable face plates are provided, each face plate having a pair of spaced apart nesting lip portions positioned to mate with the spaced apart mounting lip portions of the side panels. A plurality of connectors are provided which are operable for securing the nesting lip portions of the face plates to the support surface of each of the side panels.

The reconfigurable vehicle console includes a single piece cup holder that is structured for coupling to the console. The cup holder includes one or more beverage receptacle receivers each formed within a top plate thereof with an opening contiguous with an external surface thereof and sized to receive a beverage receptacle, and a plurality of accessory receivers each formed continuous with the top plate with an opening contiguous with the external surface thereof, wherein at least one of the accessory receivers is formed with a different shape than the beverage receptacle receivers.

According to another aspect of the reconfigurable vehicle console, the single piece cup holder is formed of a single piece that is molded, for example, by injection molding or casting, including but not limited to die casting.

According to another aspect of the reconfigurable vehicle console, at least one of the accessory receivers is formed with a different shape than a different one of the accessory receivers.

According to another aspect of the reconfigurable vehicle console, each of the plurality of interchangeable face plates further includes: a pair of spaced apart nesting lip portions positioned to mate with the support surfaces of the respective side panels, a tongue formed along a first joining edge thereof between the spaced apart nesting lip portions, a support surface formed along a joining second edge thereof between the spaced apart nesting lip portions opposite from the tongue and positioned to mate with the tongue of a different one of the face plates, and one or more of the face plates further includes a cutout positioned between the nesting lip portions and the first and second edges and sized to receive an equipment piece there through. Additionally, the top plate of the cup holder further includes: a pair of spaced apart nesting lip portions positioned to mate with the support surfaces of the respective side panels, a tongue formed along a first joining edge thereof between the spaced apart nesting lip portions and positioned to mate with the support surface of one of the face plates, and a support surface formed along a second joining edge thereof between the spaced apart nesting lip portions opposite from the tongue and positioned to mate with the tongue of one of the face plates. Furthermore, the console includes a plurality of connectors operable for securing the nesting lip portions of the top plate to the support surface of each of the side panels.

According to another aspect of the reconfigurable vehicle console, one of the end panels further includes a tongue formed along a joining edge thereof between the end portions of the side panels and is positioned to mate with the support surface positioned along the second joining edge of either one of the face plates, or the top plate of the cup holder. Also, a different one of the end panels further includes a support surface positioned along a joining edge thereof between the end portions of the side panels and is positioned to mate with the tongue positioned along the first joining edge of either one of the face plates, or the top plate of the cup holder.

According to another aspect of the reconfigurable vehicle console, the second joining edge of the face plate further includes a pair of the support surfaces positioned there along and forming a groove sized to receive the tongue therein, the second joining edge of the top plate of the cup holder further includes a pair of the support surfaces positioned there along and forming a groove sized to receive the tongue therein, and the joining edge of the end panel having the support surface further includes a pair of support lips positioned there along and forming a groove sized to receive the tongue therein.

According to another aspect of the reconfigurable vehicle console, the cup holder instead further includes: an exoskeletal frame formed continuously with the top plate thereof, the exoskeletal frame extended from the top plate adjacent to the one or more beverage receptacle receivers, a mounting plate that is continuous with the top plate and the exoskeletal frame, and the mounting plate is further secured to an external surface of one of the end panels.

According to another aspect of the reconfigurable vehicle console, the console further includes a plurality of connectors coupled between the mounting plate of the cup holder and the end panel.

According to another aspect of the reconfigurable vehicle console, the end panel further includes a plurality of apertures formed therein that are sized to receive one of the connectors. The mounting plate of the cup holder further includes a plurality of apertures formed therein that are sized to receive one of the connectors and are substantially alignable with the plurality of apertures of the one of the end panels. The plurality of connectors are received between the apertures of the mounting plate of the cup holder and the apertures of the end panel.

According to another aspect of the reconfigurable vehicle console, the connectors are optionally threaded fasteners, and the end panel further optionally includes a nut pocket that is sized to receive a nut portion of the threaded fastener.

According to another aspect of the reconfigurable vehicle console, the cup holder further includes a plurality of interconnecting support webs formed between the exoskeletal frame and each of the one or more beverage receptacle receivers.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 2 is an exemplary side view of novel equipment mounting face plate of the novel reconfigurable vehicle console shown in FIG. 1;

FIG. 3 is an exemplary end view of the novel equipment mounting face plate of the novel reconfigurable vehicle console shown in FIG. 1;

FIG. 4 is exemplary bottom view of the novel equipment mounting face plate of the novel reconfigurable vehicle console shown in FIG. 1;

FIG. 7 is a top perspective view of the novel drink cup and accessory holder of the novel reconfigurable vehicle console shown in FIG. 1 that is structured for mounting internally of the novel reconfigurable vehicle console;

FIG. 8 is a bottom perspective view of the novel drink cup and accessory holder of the novel reconfigurable vehicle console shown in FIG. 1 that is structured for mounting internally of the novel reconfigurable vehicle console, wherein some features are more clearly illustrated;

FIG. 11 is a top perspective view of the novel drink cup and accessory holder shown in FIG. 1 and that is structured for mounting externally of the novel reconfigurable vehicle console shown in FIG. 1;

FIG. 12 is a bottom perspective view of the novel drink cup holder shown in FIG. 1 and that is structured for mounting externally of the novel reconfigurable vehicle console shown in FIG. 1, wherein some features are more clearly illustrated; and FIG. 13 is a cross-section view of the novel reconfigurable vehicle console shown in FIG. 1 and showing the overlapping joints between adjacent face plates of the novel reconfigurable vehicle console shown in FIG. 1 and embodied as lap joints, as disclosed herein.

DETAILED DESCRIPTION OF PREFERRED EMBODIMENT

In the Figures, like numerals indicate like elements.

Figure 1:
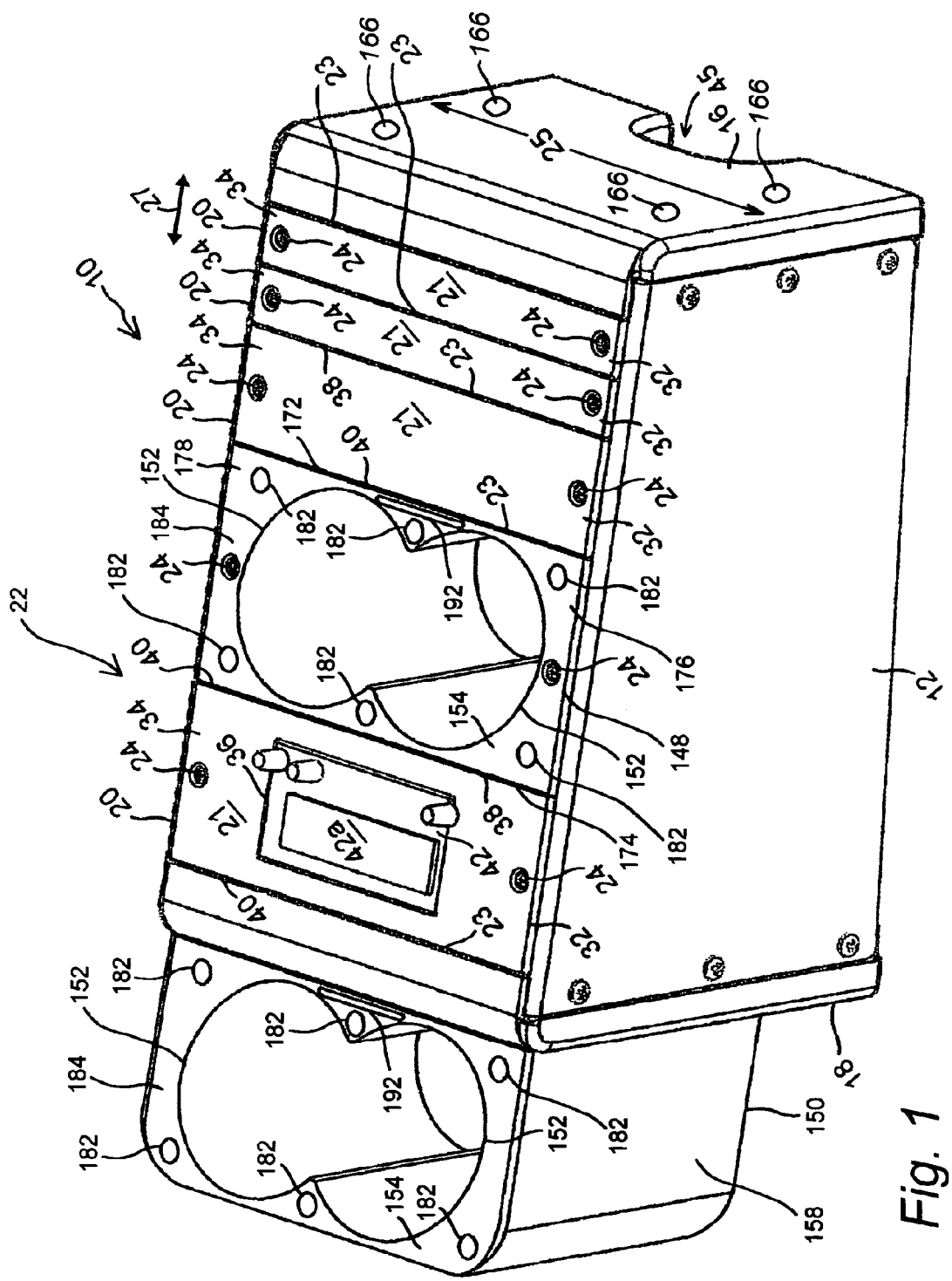
FIG. 1 is a perspective view showing an example of the novel reconfigurable vehicle console.

FIG. 1 is a perspective view that illustrates a novel reconfigurable vehicle console 10 having opposing first and second substantially rigid side panels 12 and 14 each configured for being secured to the drive shaft floor hump of the vehicle using, for example using an interface plate attached to the hump and having a plurality of fastener holes spaced along side flanges arranged along the hump. The side panels 12, 14 are substantially rigidly interconnected with opposing first and second substantially rigid end panels 16 and 18.

The end panels 16, 18 are substantially the same width such that the side panels 12, 14 are spaced apart a substantially uniform or constant distance between the end panels 16, 18, thereby forming a substantially rectangular support frame.

A plurality of substantially interchangeable face plates 20 are removably clamped to the side panels 12, 14 of the rectangular support frame between the opposing end panels 16, 18. For example, a plurality of the interchangeable face plates 20 are removably clamped between the side panels 12, 14 with respective substantially planar external or outer surfaces 21 partially forming a top or upwardly facing surface 22 of the console 10 when installed. The face plates 20 are all of a substantially uniform length 25 between the side panels 12, 14, but are optionally formed with any useful width between the end panels 16, 18. However, the face plates 20 are optionally of a minimum unit width 27 or an integral multiple of the minimum unit width 27. By example and without limitation, the all of the face plates 20 are either a minimum width 27 of about 1 inch, for example, or an integer multiple of the minimum 1 inch width 27, i.e., 2 inch, 3 inch, 4 inch, etc.

One or more cutouts 36 are formed in different face plates 20 for receiving an equipment piece 42, such as a radio, global positioning sensor (GPS), or siren and light bar controls, or other control switches. When present, the cutouts 36 are either sized to industry standards for a particular equipment piece 42, else custom sized to match a particular make and model of equipment piece 42. The face plate 20 thus functions as a face plate for the equipment piece 42 being secured thereto, with the cutout 36 functioning as a bezel surrounding an operating face 42a of the equipment piece 42. The cutouts 36 for receiving an equipment piece 42 is substantially the only significant difference between blank face plates 20 and face plates 20 for mounting an equipment piece 42.

Overlapping joints 23 are formed between adjacent face plates 20 along opposing first and second edges 38 and 40 thereof, and additional overlapping joints 23 are formed between end ones of the face plates 20 and respective adjacent end panels 16, 18. In contrast to the butt joints typical in prior art consoles, overlapping joints 23 are distinctly more sealed and secure than such butt joints.

A pair of releasable connectors 24, such as fasteners or releasable clamps, secures opposing side nesting lip portions 32 and 34 of each of the face plates 20 to the side panels 12, 14. Optionally, more of the connectors 24 may be provided for wider face plates 20.

FIG. 1 also illustrates different optional drink cup holder modules for use with the novel reconfigurable modular vehicle console 10. For example, the optional drink cup holder module is optionally configured either an internally mounted drink cup and accessory holder module 148 or an externally mounted drink cup and accessory holder module 150. When the drink cup holder module is the internally mounted drink cup holder 148, a single piece mounting plate 154 is molded having one or more integral beverage receptacle receivers 152 opening on a substantially planar external or outer surface 184 thereof that partially forms the top or upwardly facing surface 22 of the console 10 when removably installed therein. The single piece mounting plate 154 having the integral beverage receptacle receivers 152 is configured substantially similar to the face plates 20 and equipped either with tongue 80 and groove 82 to form the doubly overlapped tongue-and-groove type joints 23, or with tongue 144 and lip 146 to form the singly overlapped lap type joints 23, as disclosed in more detail herein below. A pair of the releasable connectors 24, such as screws or releasable clamps, secures opposing side nesting lip portions 176 and 178 of each of the single piece mounting plate 154 to the side panels 12, 14. Optionally, more of the connectors 24 may be provided for additional security. The alternative externally mounted drink cup and accessory holder module 150 is molded as a single piece with one or more of the integral beverage receptacle receivers 152 molded in an exoskeletal frame 158 of the molded material. As disclosed in more detail herein below, the exoskeletal frame 158 is coupled to one of the end panels 16, 18, for example, by one or more fasteners or other connectors.

The beverage receptacle receivers 152 may intersect (as shown) to maximize cup size while efficiently utilizing available space. The mounting plate 154 is also molded with a plurality of molded-in integrated accessory receivers of different types which accept multiple different accessories, e.g., pens, pencils or styluses, or business or credit cards, etc. By example and without limitation, the molded-in integrated accessory receivers of different types are distributed about the mounting plate 154 of the internally mountable drink cup holder 148 between the beverage receptacle receivers 152 and the mounting plates' lengthwise edges 172, 174 and side lip portions 176, 178. For example, a plurality of integrated accessory receivers are embodied as substantially cylindrical blind tubes 182 opening to an outer surface 184. By example and without limitation, the tubular accessory receivers are structured as pen holders and accept multiple different cylindrical accessories, e.g., pens, pencils, styluses, etc. The integrated cylindrical tube accessory receivers 182 are optionally sized for receiving commonly dimensioned pens or pencils thereinto. In another example, one or more of the integrated accessory receivers are embodied as molded-in substantially flattened blind slots 192 opening to the outer surface 184 of the mounting plate 154. Alternative sizes and shapes of the multiple molded-in integrated accessory receivers having alternative uses are also contemplated and may be included or substituted without deviating from the scope and intent of the present invention. By example and without limitation, the flattened slot accessory receivers 192 are structured as card holders and accept one or multiple different card accessories, e.g., business or credit cards. The flattened slot accessory receivers 192 are optionally sized for receiving commonly dimensioned business or credit cards thereinto for temporary storage.

FIG. 2, FIG. 3 and FIG. 4 are exemplary side, end and bottom views, respectively, of one embodiment of face plate 20 having the overlapping joints 23 optionally structured as tongue-and-groove joints. By example and without limitation, the face plate 20 is shown here having a tongue 80 positioned along one of its edges 38 (shown) or 40 and extending most of the length of the face plate 20 between the opposing side nesting lip portions 32, 34. A groove 82 is positioned along the other one of the edges 38 or 40 (shown) of the face plate 20 opposite from the tongue 80. The groove 82 is sized to receive and with mate the tongue 80. The groove 82 also extends most of the length of the face plate 20 between the opposing side nesting lip portions 32, 34 and is at least as long as the tongue 80. The tongue 80 and groove 82 of adjacent face plates 20 are joined to form the tongue-and-groove type overlapping joints 23 between adjacent face plates 20. In the tongue-and-groove type joints 23, the tongue 80 is overlapped both above and below by a pair of spaced apart upper support lip 82a and lower support lip 82b that form the groove 82. The upper support lips 82a are positioned adjacent to or flush with the outer surface 21 of the face plate 20. The tongue 80 and groove 82 of end face plates 20 are joined adjacent with end panels 16, 18 to form additional tongue-and-groove type joints 23 there between.

Locators are provided between the side panels 12, 14 and each face plate 20, as disclosed more fully herein below. Accordingly, each of opposing side nesting lip portions 32, 34 of the face plate 20 is further formed with a detent 90 positioned thereon for locating the face plate 20 on the first and second side panels 12, 14 of the console 10, as disclosed herein. By example and without limitation, the detents 90 are positioned in about the middle of the side nesting lip portions 32, 34 substantially equidistant between the edges 38, 40. The detents 90 are thus substantially aligned with a longitudinal centerline 29 of the face plate 20.

Each face plate 20 is further illustrated to have a pair of substantially upright projections 52 positioned on a substantially planar interior surface 56 thereof. Projections 52 function as mounting structure for the equipment piece 42, as discussed herein below. The upright projections 52 are positioned adjacent to and slightly inwardly of respective opposing side nesting lip portions 32, 34 of the face plate 20. The upright projections 52 are optionally formed as thin walls extended substantially completely across the inner surface 56 of the face plate 20 between its opposing edges 38, 40.

A pair of junctions 58 is positioned to the opposing edges 38, 40 and spaced away therefrom along the respective side nesting lip portions 32, 34. By example and without limitation, the junctions 58 are configured as fastener receivers for receiving a threaded fastener thereinto. When configured as fastener receivers, the junctions 58 are, for example, either blind, smooth bore holes structured for receiving self-tapping screws, or pre-threaded blind holes. Optionally, the fastener receiver junctions 58 are formed in thick bosses 84 that are optionally formed integrally with the projections 52 and configured to reinforce and stiffen the projections 52.

A pair of fastener clearance passages 50 are formed in a thick boss 86 formed on the interior surface 56 of the face plate 20, as illustrated. The bosses 86 and fastener clearance passages 50 therein are each positioned at about the middle of the face plate 20 about equidistant between the longitudinal edges 38, 40. The fastener clearance passages 50 are thus substantially aligned with the detents 90. When the pair of connectors 24 securing the face plates 20 to the side panels 12, 14 of the console 10 are configured as releasable clamps, a clearance notch 60 is formed through the upright projections 52 in a position between the respective fastener clearance passage 50 and the respective side nesting lip portions 32, 34 for operating the releasable clamp type connectors 24 there through.

The face plate 20 is further illustrated by example and without limitation to have a first side notch 92 along its tongue edge 38 and a second side notch 94 along its groove edge 40 each adjacent to a respective one of side nesting lip portions 32, 34. Edge portions 96 and 98 of the projections 52 adjacent to respective side nesting lip portions 32, 34 are positioned to coincide with the respective first and second side notches 92, 94 of an adjacent face plate 20 and sized to nest therein. The edge portions 96, 98 of the projections 52 have been found to stiffen the projections 52 and help stabilize the overlapping joints 23 between adjacent face plates 20, but are not necessary for proper functioning of the console 10.

When configure to receive an equipment piece 42, the face plate 20 is additionally formed with one or more cutouts 36 positioned between the side nesting lip portions 32, 34 and opposing first and second edges 38, 40 thereof. The cutouts 36 are sized to receive an equipment piece 42, such as a radio, global positioning sensor (GPS), or siren and light bar controls, there through with the equipment piece 42 being secured to the face plate 20 as disclosed herein. The face plate 20 is thus functions an aesthetic frame and functional support for the equipment piece 42 being secured thereto, with the cutout 36 functioning as a bezel surrounding an operating face 42a of the equipment piece 42.

Figure 5:
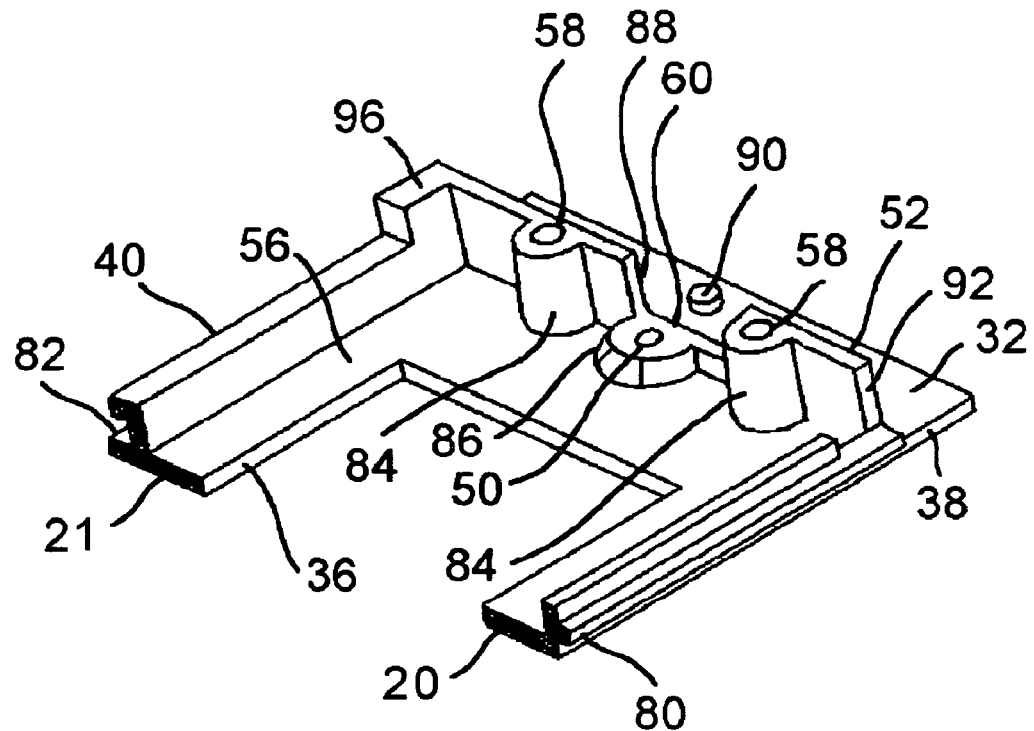
FIG. 5 is a section view taken through novel equipment mounting face plate of the novel reconfigurable vehicle console shown in FIG. 1 as indicated in FIG. 4.

FIG. 5 is a section view taken through the face plate 20 showing an illustrative partial bottom perspective view with the cutout 36 shown extending through equipment mounting face plate 20 between the exterior surface 21 and interior surface 56 thereof.

Figure 6:
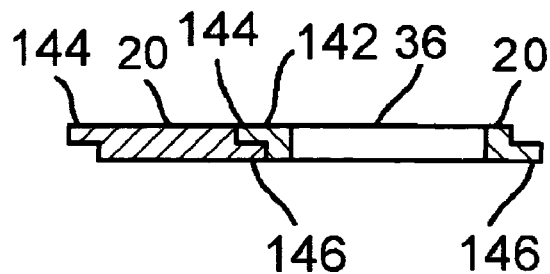
FIG. 6 is a partial cross-section view taken through the novel reconfigurable vehicle console shown in FIG. 13 and showing the overlapping joints between adjacent face plates embodied as lap joints.

FIG. 6 illustrates another embodiment of face plate 20 having the overlapping joints 23 alternatively structured as lap joints. Lap type overlapping joints 23 are formed between adjacent face plates 20 along opposing edges 38, 40 thereof. The lap type overlapping joints 23 are also formed between end face plates 20 and an adjacent one of the end panels 16, 18. Lap type overlapping joints 23 are formed of a tongue 97 laying over a lip 99. The tongue 97 is positioned adjacent to or flush with the outer surface 21 of the face plate 20. The lip 99 is positioned opposite from the tongue and adjacent to or flush with the interior surface 56 of the face plate 20. The tongue 97 and lip 99 are optionally both sized about the same, having about the same length and extending about halfway through the thickness of the face plate 20. Optionally, the lip 99 is shorter than the tongue 97 to ensure a smooth, close overlapping joint 23 on the upper surface 22 of the console 10.

FIG. 7 is a top perspective view of the drink cup and accessory holder 148 that is structured for mounting internally of the console 10. The mounting plate 154 similar to the blank plates 20 and is formed along first and second lengthwise edges 172, 174 either with tongue 80 and groove 82 (shown) to form the doubly overlapped tongue-and-groove joints 23, or with tongue 144 and lip 146 to form the singly overlapped joints 142. Opposing side lip portions 176, 178 of the mounting plate 154 are formed through with a pair of the fastener clearance passages 50 for the fastener or releasable clamp connectors 24.

The mounting plate 154 of the internally mountable drink cup holder 148 is molded on its interior surface 180 with substantially upright projections 52, as disclosed herein. Accordingly, interior surface 180 of the mounting plate 154 is molded with clearance notch 60 positioned between the respective fastener clearance passage 50 and the respective side lip portions 176, 178. Each of side nesting lip portions 176, 178 is further formed with one of the detents 90 positioned thereon for locating the mounting plate 154 on the first and second side panels 12, 14 of the console 10, as disclosed herein. The detents 90 are positioned in about the middle of the side lip portions 176, 178 equidistant between the lengthwise edges 172, 174. The detents 90 are thus substantially aligned with the fastener clearance passages 50 along a longitudinal direction of the mounting plate 154. The mounting plate 154 is further illustrated by example and without limitation to have the first side notch 92 along its tongue edge 172 and the second side notch 94 along its groove edge 174 each adjacent to a respective one of side nesting lip portions 176, 178. Edge portions 96 and 98 of the projections 52 adjacent to respective side nesting lip portions 176, 178 are positioned to coincide with the respective first and second side notches 92, 94 of one of the face plates 20 and sized to nest therein.

A plurality of the integral tube type accessory receivers 182 for receiving narrow cylindrical accessories, e.g., pens, pencils or styluses, are molded into the internally mounted drink cup holder 148, For example, the integral molded-in tube type accessory receivers 182 are embodied as slightly tapering substantially cylindrical shafts 186 extended from the interior surface 180 of the mounting plate 154. The shafts 186 of the integrated accessory receivers are molded-in having substantially cylindrical blind tubes 182 opening to the outer surface 184 with substantially closed ends 188 opposite from the outer surface 184. One or more of the integrated slot type accessory receivers 192 is molded into the internally mounted drink cup holder 148, For example, the molded-in slot accessory receivers 192 are embodied as slightly tapering substantially flattened tubes 190 extended from the interior surface 180 of the mounting plate 154. The flattened tubes 190 are formed with substantially closed ends 194 opposite from the mounting plate 154 for forming the flattened slot receivers 192 therein. As disclosed herein, alternative sizes and shapes of the multiple molded-in integrated accessory receivers having alternative uses are also contemplated and may be included or substituted without deviating from the scope and intent of the present invention.

Optionally, the outer surface 184 of mounting plate 154 is molded with identifiers 196 adjacent to one or more of the integrated accessory receivers and describing their nominal usage. By example and without limitation, the identifier 196 adjacent to one of the integrated accessory receivers embodied as the cylindrical tube receivers 182 is the word "PEN" suggesting a nominal usage of temporarily storing a pen, pencil or stylus therein. The identifier 196 adjacent to one of the integrated accessory receivers embodied as the flattened slot receiver 192 is the word "CARD" suggesting a nominal usage of temporarily storing business or credit cards in the flattened slot receiver 192. Alternative identifiers 196 may included or substituted when alternative sizes and shapes of the molded-in integrated accessory receivers are included or substituted.

FIG. 8 is a bottom perspective view of the drink cup and accessory holder 148 that is structured for mounting internally of the console 10 wherein some features are more clearly illustrated.

Figure 9:
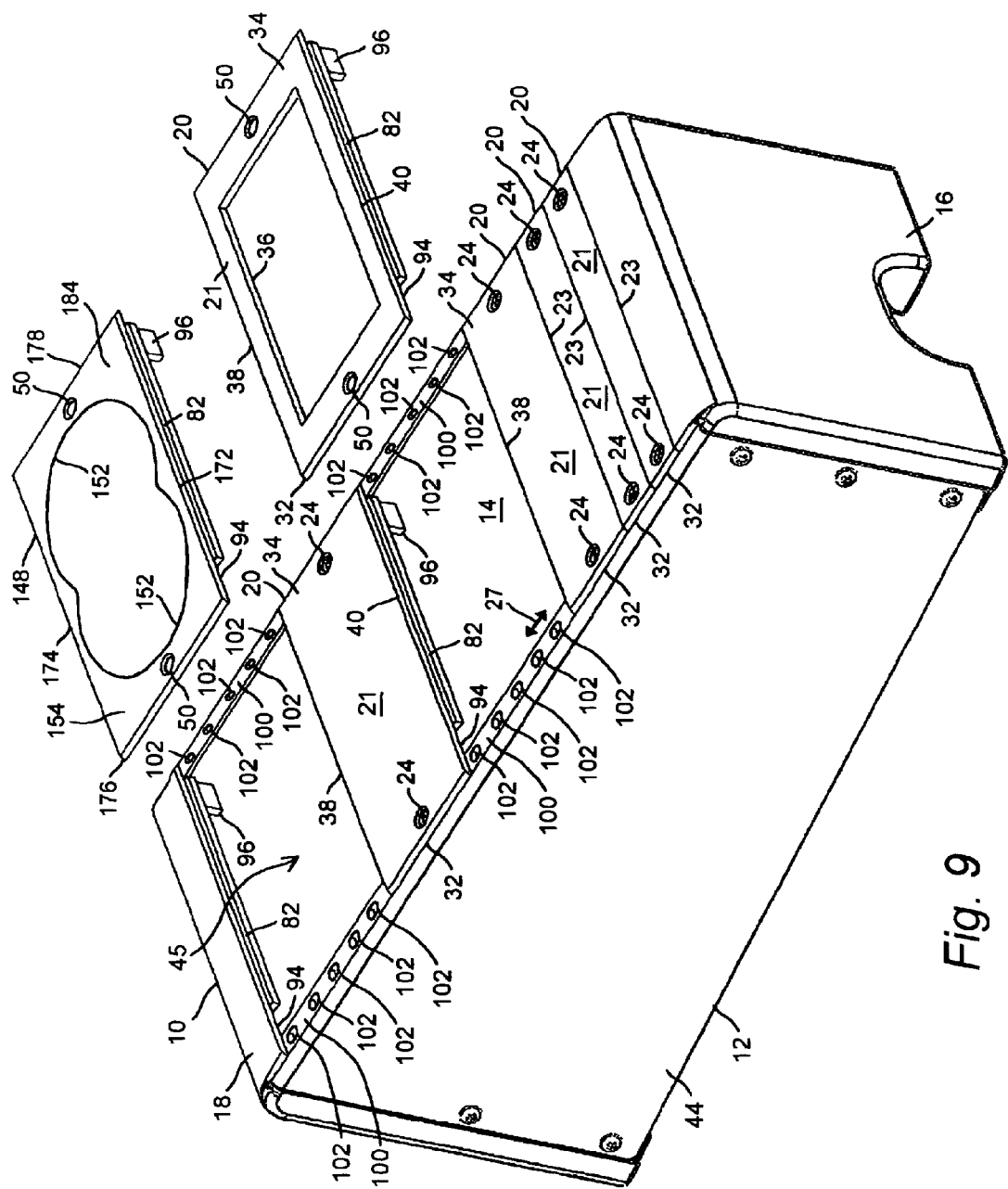
FIG. 9 illustrates installation/removal of one of the novel removable and interchangeable face plates with the novel reconfigurable vehicle console shown in FIG. 1.

FIG. 9 illustrates installation/removal of one of the face plates 20 with the console 10. As illustrated here, the overlapping joints 23 are formed between adjacent face plates 20 and between end face plates 20 and adjacent console end panels 16, 18. For example, the tongue 80 and groove 82 of each face plate 20 is matable with the groove 82 and tongue 80 of each other face plate 20, and vice versa, to form the tongue-and-groove type overlapping joints 23 there between. The tongue 80 and groove 82 of each face plate 20 is also matable with the tongue and/or groove 80, 82 of the end panels 16, 18 so that any face plate 20 is optionally positioned adjacent to either of the end panels 16, 18 for arranging different blank and equipment bearing face plates 20 as desired. Therefore, the console 10 is optionally fitted with any combination of blank and equipment bearing face plates 20 to suit an end purpose having one or more equipment piece 42 arranged on the console 10 in any order desired.

As illustrated here, side panels 12, 14 are each further formed with an upper mounting lip 100 bent at right angles from a wall portion 44 and facing one another inwardly across the console 10. The mounting lips 100 support the opposing side nesting lip portions 32, 34 of each ace plate 20, while providing clamping surfaces for the releasable clamps or other releasable connectors 24. Clearance for the two projections 52 on the interior surface 54 of the face plate 20 is provided between the upper mounting lips 100 of the side panels 12, 14. Locators are provided between the mounting lips 100 of the side panels 12, 14 and the opposing side nesting lip portions 32, 34 of each face plate 20. For example, the mounting lips 100 are formed with a plurality of upwardly facing detent receivers 102 spaced substantially uniformly there along for receiving the detents 90 formed on the face plates 20. Furthermore, the detent receivers 102 are positioned at substantially uniform intervals substantially equal to the minimum unit width 27 of the face plates 20 so as to receive any face plates 20 of any minimum or multiple width 27 with no significant gaps between adjacent face plates 20. Only by example and without limitation, the detent receivers 102 are formed as holes spaced slightly away the inwardly facing edge of the mounting lip 100. The hole type receivers 102 are sized to receive the detents 90 of any face plate 20. When the face plates 20 are assembled in the vehicle console 10 with the connectors 24, the detents 90 of the different face plates 20 anchor the side panels 12, 14 by means of the detents 90 being substantially interlocked with the hole type receivers 102 whereby the face plates 20 act as stabilizers between the side panels 12, 14 to stiffen the console 10. Therefore, the side panels 12, 14 can be made thinner and lighter without compromising to the overall stiffness and integrity of the console 10.

Alternatively, the detent receivers 102 are optionally formed as slots or notches that open into the inwardly facing edge of the mounting lip 100. The openings or notches 102 are sized to receive the detents 90 of any of the blank and equipment mounting face plates 20.

After the face plate 20 is mated with the console side panels 12, 14, the connectors 24 are installed to releasably retain each face plate 20 relative to the upper mounting lips 100. Subsequently, the different blank and equipment bearing face plates 20 can be removed and interchanged at will to arrange and rearrange the console 10 as desired. More equipment pieces 42 can be accommodated by utilizing more of the face plates 20 having the cutouts 36, or some of the equipment bearing face plates can be replaced with non-equipment bearing or blank face plates 20. Alternatively, the different equipment pieces 42 can be accommodated by utilizing different face plates 20 of different sizes with cutouts 36 sized and shaped to receive the different equipment pieces 42. Accordingly, in contrast to prior art consoles, the console 10 is truly reconfigurable.

FIG. 9 also illustrates installation/removal of the internally mounted drink cup and accessory holder 148 with the console 10. As illustrated here, the overlapping joints 23 are formed between the internally mounted drink cup holder 148 and both adjacent face plate 20 and adjacent console end panel 16 or 18 (shown). For example, the tongue 80 and groove 82 of the drink cup holder 148 is matable with the groove 82 and tongue 80 of each face plate 20, and vice versa, to form the tongue-and-groove type overlapping joints 23 there between. The tongue 80 and groove 82 of the drink cup holder 148 is also matable with the tongue and/or groove 80, 82 of the end panels 16, 18 so that the drink cup holder 148 is optionally positioned adjacent to either of the end panels 16, 18 for arranging the beverage receptacle receivers 152 as desired. Therefore, the console 10 is optionally fitted with any combination of blank and equipment bearing face plates 20 to suit an end purpose having one or more equipment piece 42 arranged with the drink cup holder 148 on the console 10 in any order desired.

As illustrated here, the drink cup holder 148 is mated with the upper mounting lip 100 of the side panels 12, 14 with the detent receivers 102 receiving the detents 90 formed on the interior surface 180 of the mounting plate 154. The mounting lips 100 support the opposing side nesting lip portions 176, 178 of the mounting plate 154, while providing clamping surfaces for the releasable clamps or other releasable connectors 24. The drink cup holder 148 is secured to the mounting lips 100 by connectors 24 operating through clearance passages 50. When the drink cup holder 148 is assembled in the vehicle console 10 with the connectors 24, the side panels 12, 14 are anchored by means of the detents 90 being substantially interlocked with the receivers 102 whereby the mounting plate 154 acts as a stabilizer between the side panels 12, 14 to stiffen the console 10. Therefore, the side panels 12, 14 can be made thinner and lighter without compromising to the overall stiffness and integrity of the console 10.

After the drink cup and accessory holder 148 is mated with the console side panels 12, 14, the connectors 24 are installed to releasably retain it relative to the upper mounting lips 100. Subsequently, the different blank and equipment bearing face plates 20 can be removed and interchanged at will with the drink cup holder 148 to arrange and rearrange the console 10 as desired. More equipment pieces 42 can be accommodated by utilizing more of the face plates 20 having the cutouts 36, or some of the equipment bearing face plates can be replaced with non-equipment bearing or blank face plates 20. Accordingly, in contrast to prior art consoles, the console 10 is truly reconfigurable.

Figure 10:
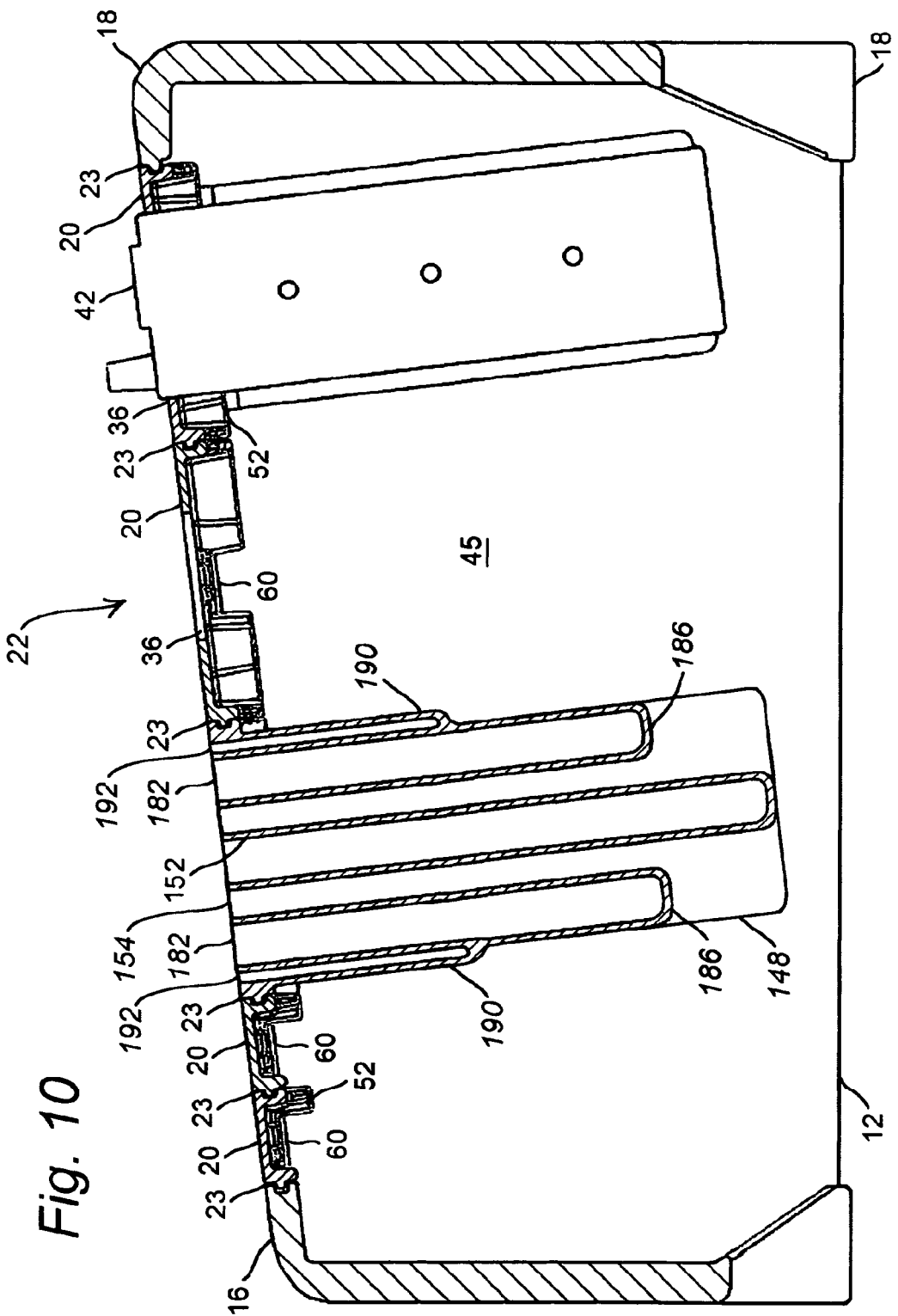
FIG. 10 is a cross-section view of the novel reconfigurable vehicle console shown in FIG. 1 and showing the overlapping joints configured as tongue-and-groove joints between the drink cup and accessory holder and adjacent face plates, as well as additional tongue-and-groove type overlapping joints between end face plates and adjacent end panels of the novel console.

FIG. 10 is a cross-section view of the console 10 showing the overlapping joints 23 configured as tongue-and-groove joints between the drink cup and accessory holder 148 and adjacent face plates 20, as well as additional tongue-and-groove type overlapping joints 23 between end face plates 20 and adjacent end panels 16, 18, as disclosed herein.

FIG. 11 is a top perspective view of the drink cup and accessory holder 150 that is structured for mounting externally of the console 10. By example and without limitation, the exoskeletal frame 158 of the externally mounted drink cup holder 150 is molded with a mounting plate 162 with one or more integral connector clearance apertures 164 molded as holes or slots (shown) that are positioned to be substantially alignable with the connector clearance apertures 166 of the end panels 16, 18. The exoskeletal frame 158 of the externally mounted drink cup holder 150 is molded with a presentation plate 198 integral with the mounting plate 162. The presentation plate 198 is molded with a substantially planar external or outer surface 200 having one or more (shown) of the beverage receptacle receivers 152 opening thereon. The beverage receptacle receivers 152 extend from an interior surface 202 of the presentation plate 198, as more clearly shown in FIG. 12. According to one embodiment of the externally mounted drink cup holder 150, one or more of the beverage receptacle receivers 152 are partially open to the adjacent mounting plate 162 portion of the exoskeletal frame 158, which provides access to the clearance apertures 164 for inserting and tightening fasteners or other connectors 160. By example and without limitation, an optional relief 204 is molded in a wall portion 206 of the beverage receptacle receiver 152 by spaced apart interconnecting support webs 159 of molded material. This relief 204 also provides clearance for a head of the fastener or other connector 160.

The presentation plate 198 of the externally mounted drink cup holder 150 is also molded with a plurality of the molded-in integrated accessory receivers of different types, e.g., pen and card holders, which accept multiple different accessories, e.g., pens, pencils, styluses, business cards, etc., each opening to the outer surface 200. By example and without limitation, one or more of the molded-in accessory receivers are embodied as pen and pencil holders, i.e., as tubular accessory holders having the substantially cylindrical but slightly tapering tube receivers 182 formed in shafts 186 extended from the interior surface 202 of the presentation plate 198 and having substantially closed ends 188. Additionally, one or more of the integrated slot type accessory receivers 192 are embodied as card holders opening to its outer surface 200. The slot type accessory receivers 192 are molded into slightly tapering substantially flattened tubes 190 extended from the interior surface 202 of the presentation plate 198 with the substantially closed ends 194 opposite from the presentation plate 198. Alternative sizes and shapes of the multiple molded-in integrated accessory receivers having alternative uses are also contemplated and may be included or substituted without deviating from the scope and intent of the present invention.

Optionally, the outer surface 200 of the presentation plate 198 is molded with the identifiers 196 adjacent to one or more of the integrated accessory receivers and describing their nominal usage, as disclosed herein.

The exoskeletal frame 158 of the externally mounted drink cup holder 150 optionally includes an integrally molded skirt portion 208 that extends from the presentation plate 198 and substantially surrounds the beverage receptacle receivers 152 and the multiple other accessory receivers 182, 192. For example, the molded skirt portion 208 interconnects with the molded mounting plate 162 and is molded integrally therewith through rounded corner portions 210. Integral molding of the presentation plate 198 with the beverage receptacle receivers 152 and other accessory receivers 182, 192 as well as the skirt portion 208 and intersecting mounting plate 162 ensures the drink cup holder 150 is sufficiently rigid to be externally mounted on the console 10.

FIG. 12 is a bottom perspective view of the drink cup holder 150 that is structured for mounting externally of the console 10 wherein some features are more clearly illustrated. For example, the interconnecting webs 159 of molded material supporting the integral beverage receptacle receivers 152 in the exoskeletal frame 158 are shown here. The molded corner portions 210 of the exoskeletal frame 158 are more clearly illustrated interconnecting the molded skirt portion 208 with the molded mounting plate 162.

FIG. 13 is a cross-section view of the console 10 showing the overlapping joints 23 configured as lap joints between adjacent face plates 20, as well as additional lap type joints 23 between end face plates 20 and adjacent end panels 16, 18, as disclosed herein.

The externally mounted drink cup holder 150 is coupled to one of the end panels 16, 18, for example, by fastener type connectors 160. As disclosed herein by example and without limitation, the mounting plate 162 of the exoskeletal frame 158 is molded with one or more integral clearance apertures 164 embodied as holes or slots (shown). The end panels 16, 18 are, for example, formed through with one or more clearance apertures 166. A plurality of the fastener type connectors 160 are received between the clearance apertures 164 in the mounting plate 162 of the drink cup holder 150 and the corresponding clearance apertures 166 in either one of the end panels 16, 18 of the console 10. Optionally, the end panels 16, 18 are additionally molded with nut pocket recesses 168 concentric with respective clearance apertures 166 and structured as a square or hexagonal (shown) socket shape to receive a nut 170 sized to mate with the fastener type connectors 160 and be restrained thereby from turning when the fastener 160 is turned for either tightening or loosening. Both end panels 16, 18 are molded with the connector clearance apertures 166 and nut pocket recesses 168 so the alternative drink cup holder 150 is optionally externally mounted on either end of the console 10. If desired, the console 10 can be equipped as illustrated with both the drink cup holder 148 mounted internally within the interior portion 45 and the drink cup holder 150 mounted externally on either or both of the end panels 16, 18 to maximize drink holding capacity.

While the preferred and additional alternative embodiments of the invention have been illustrated and described, it will be appreciated that various changes can be made therein without departing from the spirit and scope of the invention. Therefore, it will be appreciated that various changes can be made therein without departing from the spirit and scope of the invention. Accordingly, the inventor makes the following claims.

What is claimed is:

1. A reconfigurable vehicle console, comprising:
a pair of substantially rigid side panels, each side panel further comprising a wall portion formed with a support surface;
a pair of substantially rigid end panels substantially rigidly interconnected between the side panels adjacent to respective end portions thereof and spacing apart the respective support surfaces thereof;
a plurality of interchangeable face plates each comprising a pair of spaced apart nesting lip portions positioned to mate with the spaced apart support surfaces of the side panels;
a plurality of connectors operable for securing the nesting lip portions of the face plates to the support surface of each of the side panels; and
a single piece cup holder structured for coupling to the console, the cup holder comprising:
one or more beverage receptacle receivers each formed within a top plate thereof with an opening contiguous with an external surface thereof and sized to receive a beverage receptacle, and
a plurality of accessory receivers each formed within the top plate with an opening contiguous with the external surface thereof, wherein at least one of the accessory receivers is formed with a different shape than the beverage receptacle receivers.

2. The console of claim 1 wherein at least one of the accessory receivers is formed with a different substantially tubular shape than a different one of the accessory receivers having a substantially slotted shape.

3. The console of claim 1 wherein each of the plurality of the interchangeable face plates further comprises:
a tongue formed along a first joining edge thereof between the spaced apart nesting lip portions,
a support surface formed along a second joining edge thereof between the spaced apart nesting lip portions opposite from the tongue and positioned to mate with the tongue of a different one of the face plates, and
one or more of the face plates further comprising a cutout positioned between the nesting lip portions and the first and second joining edges and sized to receive an equipment piece there through;
wherein the top plate of the cup holder further comprises:
a pair of spaced apart nesting lip portions positioned to mate with the support surfaces of the respective side panels,
a tongue formed along a first joining edge thereof between the spaced apart nesting lip portions and positioned to mate with the support surface of one of the face plates, and
a support surface formed along a second joining edge thereof between the spaced apart nesting lip portions opposite from the tongue and positioned to mate with the tongue of one of the face plates; and
a plurality of connectors operable for securing the nesting lip portions of the top plate to the support surface of each of the side panels.

4. The console of claim 3 wherein one of the end panels further comprises a tongue formed along a first joining edge thereof between the end portions of the side panels and positioned to mate with the support surface positioned along the second joining edge of one of the face plates and the top plate of the cup holder, and
wherein a different one of the end panels further comprises a support surface positioned along a joining edge thereof between the end portions of the side panels and positioned to mate with the tongue positioned along the first joining edge of one of the face plate and the top plate of the cup holder.

5. The console of claim 3 wherein the second joining edge of the face plate further comprises a pair of the support surfaces positioned there along and forming a groove sized to receive the tongue therein,
wherein the second joining edge of the top plate of the cup holder further comprises a pair of the support surfaces positioned there along and forming a groove sized to receive the tongue therein, and
wherein the joining edge of the end panel comprising the support surface further comprises a pair of support lips positioned there along and forming a groove sized to receive the tongue therein.

6. The console of claim 1 wherein the cup holder further comprises:
an exoskeletal frame continuous with the top plate thereof, the exoskeletal frame extended from the top plate adjacent to the one or more beverage receptacle receivers,
a mounting plate continuous with the top plate and the exoskeletal frame, and
wherein the mounting plate is further secured to an external surface of one of the end panels.

7. The console of claim 4, further comprising a plurality of connectors coupled between the mounting plate of the cup holder and the end panel.

8. The console of claim 7 wherein the end panel further comprises a plurality of apertures therein sized to receive one of the connectors;
the mounting plate of the cup holder further comprises a plurality of apertures therein sized to receive one of the connectors and being substantially alignable with the plurality of apertures of the one of the end panels; and
wherein the plurality of connectors are received between the apertures of the mounting plate of the cup holder and the apertures of the end panel.

9. The console of claim 8 wherein the connectors further comprise threaded fasteners, and the end panel further comprises a nut pocket substantially aligned with one or more of the apertures therein and sized to receive a portion of the threaded fastener.

10. The console of claim 9, further comprising a plurality of interconnecting support webs formed between the exoskeletal frame and each of the one or more beverage receptacle receivers.

* * * * *